United States Patent
Reichstein et al.

(10) Patent No.: US 8,693,375 B2
(45) Date of Patent: Apr. 8, 2014

(54) AUTOMATED MULTIPLE-INSTANCE SPANNING TREE RECONFIGURATION

(75) Inventors: Frank A. Reichstein, Roseville, CA (US); Shaun K. Wakumoto, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1545 days.

(21) Appl. No.: 11/581,815

(22) Filed: Oct. 17, 2006

(65) Prior Publication Data

US 2008/0089245 A1 Apr. 17, 2008

(51) Int. Cl.
*H04L 12/28* (2006.01)
*H04L 12/58* (2006.01)
*H04L 12/56* (2006.01)
*H04L 12/44* (2006.01)

(52) U.S. Cl.
CPC ............... *H04L 45/02* (2013.01); *H04L 12/44* (2013.01); *H04L 45/48* (2013.01)
USPC ............................ 370/256; 370/401; 370/408

(58) Field of Classification Search
CPC .......... H04L 12/44; H04L 45/02; H04L 45/48
USPC .......................................... 370/256, 401, 408
See application file for complete search history.

(56) References Cited

U.S. PATENT DOCUMENTS

| | | | | |
|---|---|---|---|---|
| 6,219,739 B1* | 4/2001 | Dutt et al. | ...................... | 710/311 |
| 6,937,576 B1* | 8/2005 | Di Benedetto et al. | ....... | 370/256 |
| 7,075,939 B2* | 7/2006 | Kalkunte et al. | .............. | 370/401 |
| 2003/0051032 A1* | 3/2003 | Schenkel et al. | .............. | 709/224 |
| 2006/0268747 A1* | 11/2006 | van Haalen et al. | .......... | 370/256 |
| 2006/0268749 A1* | 11/2006 | Rahman et al. | ............... | 370/256 |
| 2007/0263554 A1* | 11/2007 | Finn | .............................. | 370/256 |

OTHER PUBLICATIONS

Cisco—Understanding Multiple Spanning Protocol (802.1s), White Papers, Document ID: 24248, pp. 1-14, [retrieved on Oct. 13, 2006]. Retrieve from the internet: URL:http://www.cisco.com/warp/public/473/147.html.

* cited by examiner

*Primary Examiner* — Hassan Phillips
*Assistant Examiner* — Lonnie Sweet (57) ABSTRACT

One embodiment relates to a method of automated multiple-instance spanning tree reconfiguration. Query packets are sent to switches within an multiple-instance spanning tree (MST) region, and response packets are received from the switches with traffic utilization data for ports of the switches. An MST reconfiguration is determined. The MST reconfiguration is propagated to the switches within the MST region. Other embodiments and features are also disclosed.

19 Claims, 9 Drawing Sheets

AUTOMATED MULTIPLE-INSTANCE SPANNING TREE RECONFIGURATION

BACKGROUND

1. Field of the Invention

The present disclosure relates generally to computer networking. More particularly, the present disclosure relates to spanning tree protocols.

2. Description of the Background Art

Spanning tree protocol (STP) and its variants, including rapid spanning tree protocol (RSTP) and multiple-instance spanning tree protocol (MSTP), are link management protocols that prevent undesirable loops in a network while allowing for path redundancy. Undesirable loops occur when there are multiple active paths between stations. If a loop exists, a switch or bridge may see stations appearing on more than one link of the switch. This can confuse the forwarding algorithm, allowing duplicate frames to be forwarded. Further, multicast traffic entering the loop multiplies, but never leaves the loop, eventually bringing the network down.

STP computes a tree that spans all switches in an extended network and forces select redundant data paths into a standby or blocked state. If one segment of the network becomes unreachable, STP can re-establish connectivity to that segment by activating a standby path. In order to accomplish this, one switch (bridge) is designated as the root of the spanning tree. STP is a distributed protocol and relies on the exchange of messages between neighbors to compute and implement the spanning tree. When there are changes in the network due to failure or equipment upgrades, the protocol needs to recompute the tree. During such times, the forwarding of traffic may be disrupted for a period of time, sometimes referred to as the convergence time of the protocol, which can range from milliseconds to seconds.

The traditional spanning tree protocol (IEEE 802.1d) is limited to only one path through the spanning tree environment. Multiple-instance spanning tree protocol (MSTP) (IEEE 802.1.s) addresses this limitation. MSTP allows multiple spanning tree instances, each instance providing a different path through the multiple-instance spanning tree (MST) region. With MSTP, numerous virtual local area networks (VLANs) may be mapped to various MSTP instances.

SUMMARY

One embodiment relates to a method of automated multiple-instance spanning tree reconfiguration. Query packets are sent to switches within an multiple-instance spanning tree (MST) region, and response packets are received from the switches with traffic utilization data for ports of the switches. An MST reconfiguration is determined. The MST reconfiguration is propagated to the switches within the MST region.

Another embodiment pertains to a network management apparatus that includes a processor, memory for storing processor-executable instructions and data, an internal communication system, and at least one port. The memory includes a) processor-executable code configured to determine an MST reconfiguration; and b) processor-executable code configured to send packets to multiple-instance spanning tree protocol (MSTP) enabled switches within a MST region so as to propagate said MST reconfiguration.

Another embodiment pertains to a network switching apparatus which includes memory for storing processor-executable instructions and data. The memory includes a) processor-executable code configured to obtain traffic utilization data for all ports of the apparatus when a query packet for the traffic utilization data is received; b) processor-executable code configured to send a response packet in reply to the query packet, wherein the response packet includes the traffic utilization data; and c) processor-executable code configured to replace a prior multiple-instance configuration with a new multiple-instance configuration.

Other embodiments and features are also disclosed.

DETAILED DESCRIPTION

As discussed above, multiple-instance spanning tree protocol (MSTP) allows the use of multiple spanning tree instances, each instance providing a different path through the multiple-instance spanning tree (MST) region. With MSTP, numerous virtual local area networks (VLANs) may be mapped to various MSTP instances.

A drawback to MSTP is the administrative burden relating to manually configuring the multiple-instance spanning tree. Determining the way to divide the VLANs into groups for assignment to the MSTP instances, and configuring the appropriate ports to be blocked, may be difficult. Moreover, once configured, the configuration usually remains static and does not typically change.

The present disclosure provides methods and apparatus for automated multiple-instance spanning tree reconfiguration. In other words, the techniques disclosed herein relates to automated and dynamic re-organization of the mappings of VLANs to MSTP instances based on traffic conditions within the network.

Figure 1:
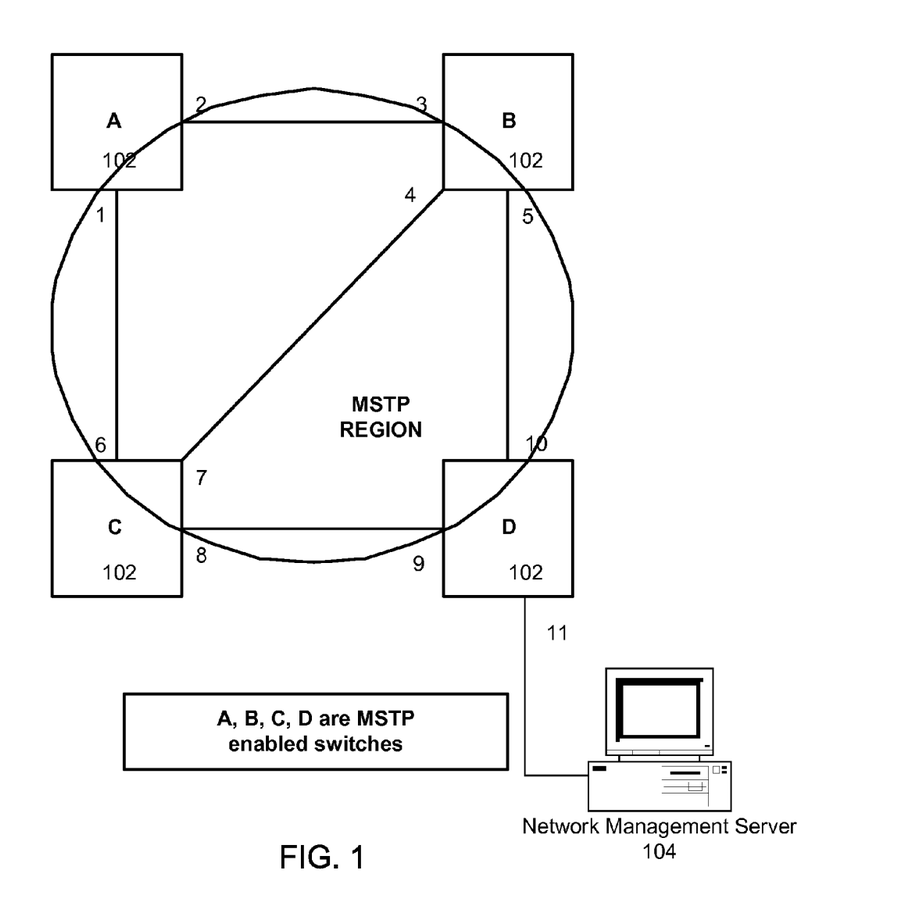
FIG. 1 is a schematic diagram depicting an example network of MSTP-enabled switches for discussing the operation of the disclosed technique in accordance with an embodiment of the invention.

FIG. 1 is a diagram depicting an example network topology for discussing the operation of the disclosed technique in accordance with an embodiment of the invention. The example network includes four switches (bridges) 102 with five communication links interconnecting them as shown.

The four switches 102 are labeled A, B, C, and D. The pertinent ports of the switches are labeled by numbers for purposes of identification in the following discussion.

In this particular example, a first link interconnects port 2 of switch A to port 3 of switch B. A second link interconnects port 5 of switch B to port 10 of switch D. A third link interconnects port 9 of switch D to port 8 of switch C. A fourth link interconnects port 6 of switch C to port 1 of switch A. Finally, a fifth link interconnects port 4 of switch B to port 7 of switch C. A network management server 104 is shown as being interconnected with the network by way of port 11 of switch D.

Figure 2A:
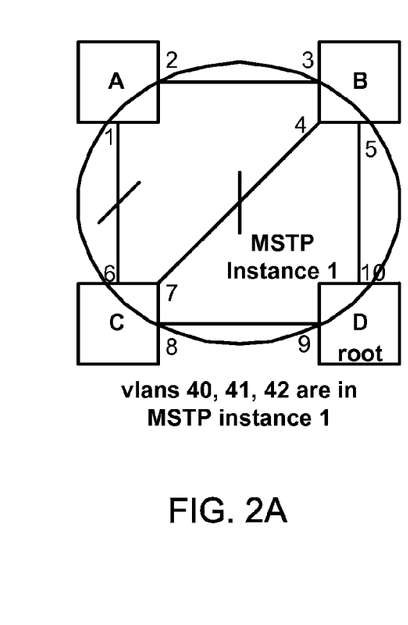
FIGS. 2A, 2B and 2C are schematic diagrams depicting three MSTP instances of the example network of FIG. 1.
Figure 2B:
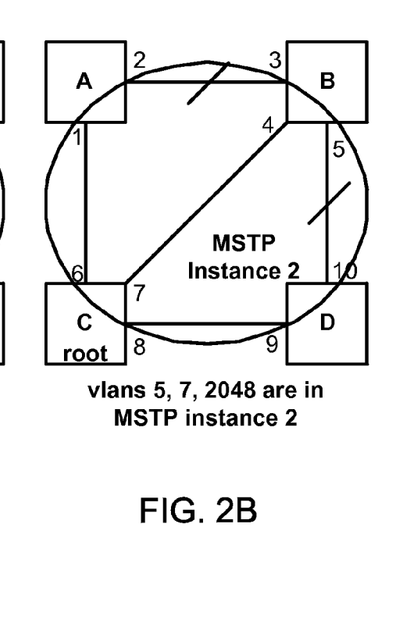
Figure 2C:
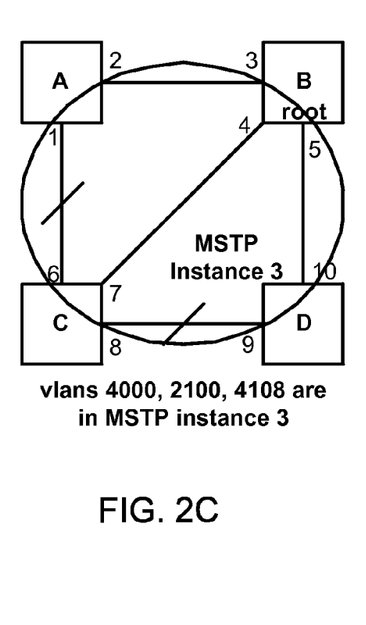

FIGS. 2A, 2B and 2C are schematic diagrams depicting three MSTP instances of the example network of FIG. 1. The network may support numerous virtual local area networks (VLANs). For example, up to 4,096 VLANs may be supported. Each of the switches 102 includes a table that associates each VLAN to one of the MSTP instances. In this example, several VLANs are mapped onto each of the three MSTP instances.

Detailed configurations of these three MSTP instances are described below for purposes of discussing the present invention. Of course, in actual practice, the number of switches may be more or less than four, the number of MSTP instances may be more or less than three, and the detailed configurations of the MSTP instances will vary depending on the specific network and other circumstances.

FIG. 2A depicts a first MSTP instance (MSTP instance 1). Three VLANs (having VLAN identifiers 40, 41 and 42) are mapped to MSTP instance 1. MSTP instance 1 has switch D as the root switch. Ports 1 and 4 are blocked in MSTP instance 1. More specifically, the port roles are as follows. Ports 8, 5, and 2 are root ports. Ports 9, 10, 3, 6, and 7 are designated ports. Finally, ports 1 and 4 are alternate ports (which are blocking ports).

FIG. 2B depicts a second MSTP instance (MSTP instance 2). Three VLANs (having VLAN identifiers 5, 7, and 2048) are mapped to MSTP instance 2. MSTP instance 2 has switch C as the root switch. Ports 3 and 5 are blocked in MSTP instance 2. More specifically, the port roles are as follows. Ports 1, 4 and 9 are root ports. Ports 6, 7, 8, 2, and 10 are designated ports. Finally, ports 3 and 5 are alternate ports (which are blocking ports).

FIG. 2C depicts a third MSTP instance (MSTP instance 3). Three VLANs (having VLAN identifiers 4000, 2100, and 4108) are mapped to MSTP instance 3. MSTP instance 3 has switch B as the root switch. Ports 6 and 8 are blocked in MSTP instance 3. More specifically, the port roles are as follows. Ports 2, 7, and 10 are root ports. Ports 3, 4, 5, 1, and 9 are designated ports. Finally, ports 6 and 8 are alternate ports (which are blocking ports).

Figure 3:
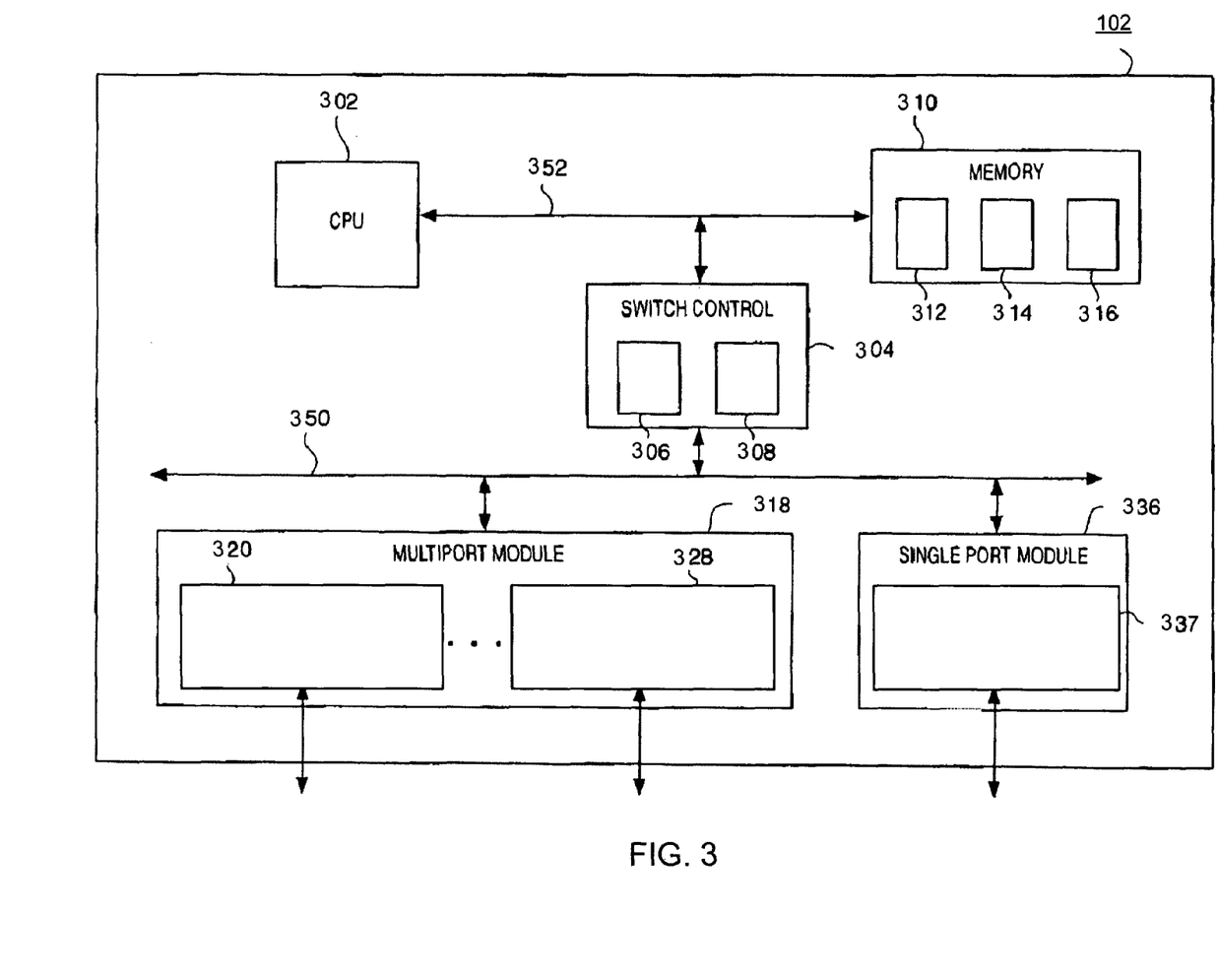
FIG. 3 is a schematic diagram of an example switch which may be a node of the example network of FIG. 1.

FIG. 3 is a schematic diagram of an example switch 102 which may be a node of the example network of FIG. 1. The specific configuration of the switches, bridges, or similar such network devices within a network will vary depending on the specific implementation of the network.

A central processing unit (CPU) 302 performs overall configuration and control of the switch 300 operation. The CPU 302 operates in cooperation with switch control 304, an application specific integrated circuit (ASIC) designed to assist CPU 302 in performing packet switching at high speeds required by modern networks.

The switch control 304 controls the "forwarding" of received packets to appropriate locations within the switch for further processing and/or for transmission out another switch port. Inbound and outbound high speed FIFOs (306 and 308, respectively) may be included with the switch control 304 for exchanging data over a switch bus 350 with port modules.

Memory 310 may include inbound/outbound queues 312, various processor-executable code routines 314, and other data 316. The processor-executable code routines 314 may include those for executing the operations relating to multiple instance spanning tree protocol. In accordance with an embodiment of the invention, the routines 314 may also be configured to implement operations relating to the automated multiple-instance spanning tree reconfiguration, for example, such as those discussed below in relation to FIG. 9. A communications bus 352 may interconnect the CPU 302, switch control 304, and memory 310.

The ports of the switch may be embodied as plug-in modules that connect to the switch bus 350. Each such module may be, for example, a multi-port module 318 having a plurality of ports (for example, 320 through 328) in a single module or may be a single port module 336 having a single port 337.

As packets are received from a port, the packet data may be applied to the switch bus 320 in such a manner as to permit monitoring of the packet data by switch control 304. The switch control 304 may be configured to manage access to switch bus 350 by all port modules (i.e., 318 and 336). All port modules may "listen" to packets as they are received and applied by a receiving port module to switch bus 350.

Figure 4:
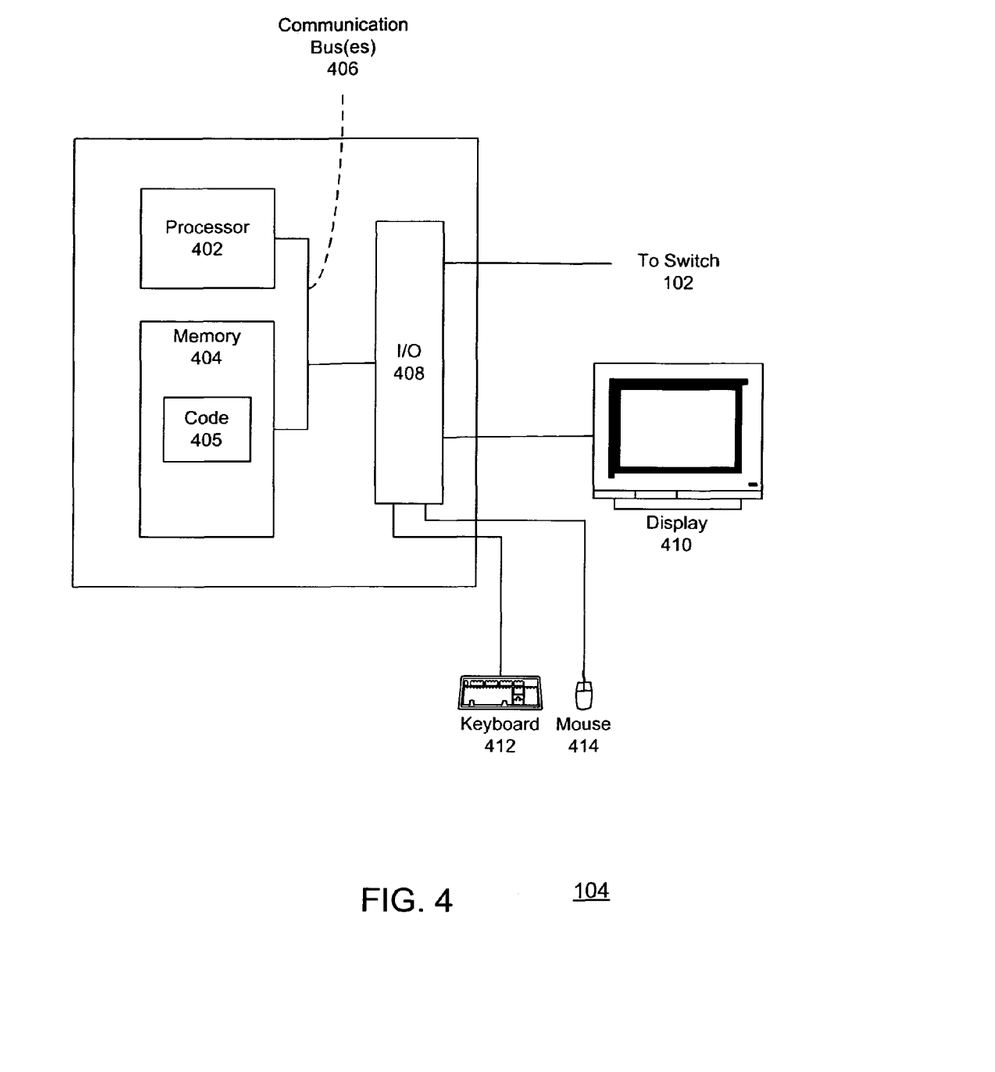
FIG. 4 is a schematic diagram of an example network management station which may be configured to manage the example network of FIG. 1.

FIG. 4 is a schematic diagram of an example network management server 104 which may be configured to manage the example network of FIG. 1. In the example depicted in FIG. 1, the network management server 104 is interconnected to Switch D. (Of course, the server could be interconnected to any other of the switches instead.) The server 104 executes network management software so as to manage the network. In this example, the network management server 104 includes a processor 402, memory 404, communication bus(es) 406, input/output interfaces 408, a display 410, a keyboard 412, and a mouse 414.

The memory 404 is configured to store processor-executable code 405 and other data. The communication bus or buses 406 are configured to communicatively couple components within the apparatus, such as the processor, memory and input/output interfaces. The input/output interfaces 408 includes at least one port communicatively coupled to another device in the network. The port may comprise, for example, an ethernet type port.

The processor-executable code 405 in the memory 404 may be configured to perform various network management functionalities, including the operations for automated multiple-instance spanning tree reconfiguration as disclosed herein and discussed in detail below in relation to FIGS. 5, 6, 7, and 8.

Figure 5:
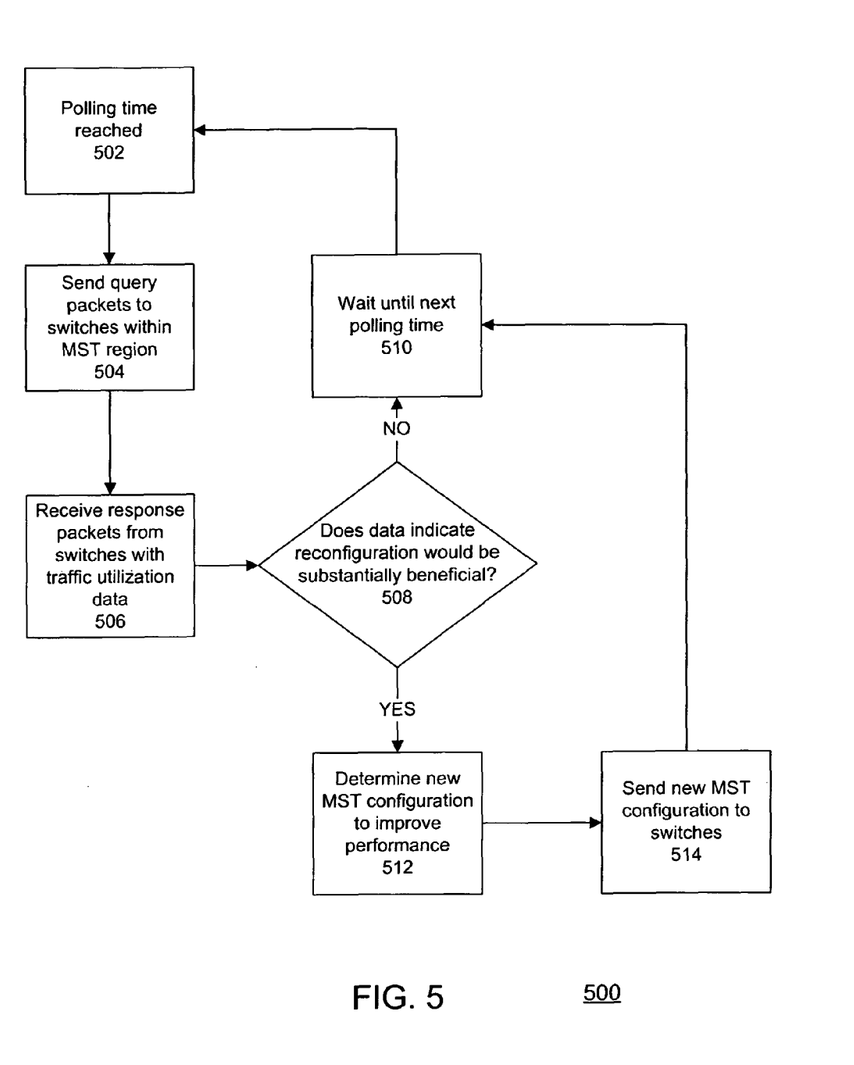
FIG. 5 is a flow chart depicting a method of multiple-instance spanning tree reconfiguration in accordance with an embodiment of the invention.

FIG. 5 is a flow chart depicting a method 500 of multiple-instance spanning tree reconfiguration in accordance with an embodiment of the invention. This method 500 may be performed, for example, using an external network management server 104.

In this embodiment, the server 104 may periodically poll all of the switches within the MSTP environment (MST region) for traffic utilization on all of the switch ports. When a polling time is reached (i.e. when it is time for the periodic polling to be performed) 502, the server 104 may send 504 query packets to the switches 102 within the MST region.

When one of the MSTP-enabled switches 102 receives the query, it obtains traffic utilization related data to be sent back in a response. The traffic utilization related data may include, for example, remote monitoring (RMON) counters, port queue depths, numbers of packets transmitted and dropped, and other traffic utilization related data.

The server 104 receives 506 the response packets from the various switches 102 in the MST region. Based on the traffic utilization data, processor-executable code in the server 104 may determine 508 whether the data indicates that a multiple-instance spanning tree reconfiguration would be substantially beneficial.

If a reconfiguration would not be substantially beneficial, then no reconfiguration is performed, and the method 500 may proceed to wait 510 until the next polling time is reached 502.

On the other hand, if a reconfiguration would be substantially beneficial, then a determination 512 is made of a specific reconfiguration to substantially improve performance. For example, the determination 512 may be made so as to maximize the overall performance of the network in the MST region and also to minimize the possibility of traffic loss.

The new multiple-instance spanning tree configuration may then be sent 514 from the server 104 to the switches 102. In one implementation, simple network management protocol (SNMP) may be used to send 514 the new configuration from the server 104 to the switches 102. Thereafter, the method 500 may proceed to wait 510 until the next polling time is reached 502.

For example, consider the multiple-instance spanning tree configuration depicted in FIGS. 2A, 2B and 2C. Consider further that the link between switches C and D is over utilized on VLANs 40 and 41 (which are mapped to MSTP instance 1). Meanwhile, the link between switches B and C is only lightly utilized by the VLANs mapped to MSTP instances 2 and 3, and the link between switches C and D is also only lightly utilized by the VLANs mapped to MSTP instance 3. In that case, a multiple-instance spanning tree reconfiguration may be substantially beneficial. For example, the reconfiguration which is determined 512 may re-map VLAN 40 (or alternatively VLAN 41) from MSTP instance 1 to MSTP instance 3. After such a reconfiguration, the traffic on VLAN 40 between switches C and D will no longer travel across the direct link between switches C and D. This will relieve the over utilization of that link. Instead, the traffic on VLAN 40 between switches C and D will travel on the path going from switch C to switch B to switch D. Alternatively or in addition to such remappings of VLANs to MSTP instances, other types of MST reconfigurations may be determined 512. For example, MSTP parameters (such as, for instance, port path costs and port priorities) may be modified. Modifying these MSTP parameters may result in a change of the blocking scheme.

Figure 6:
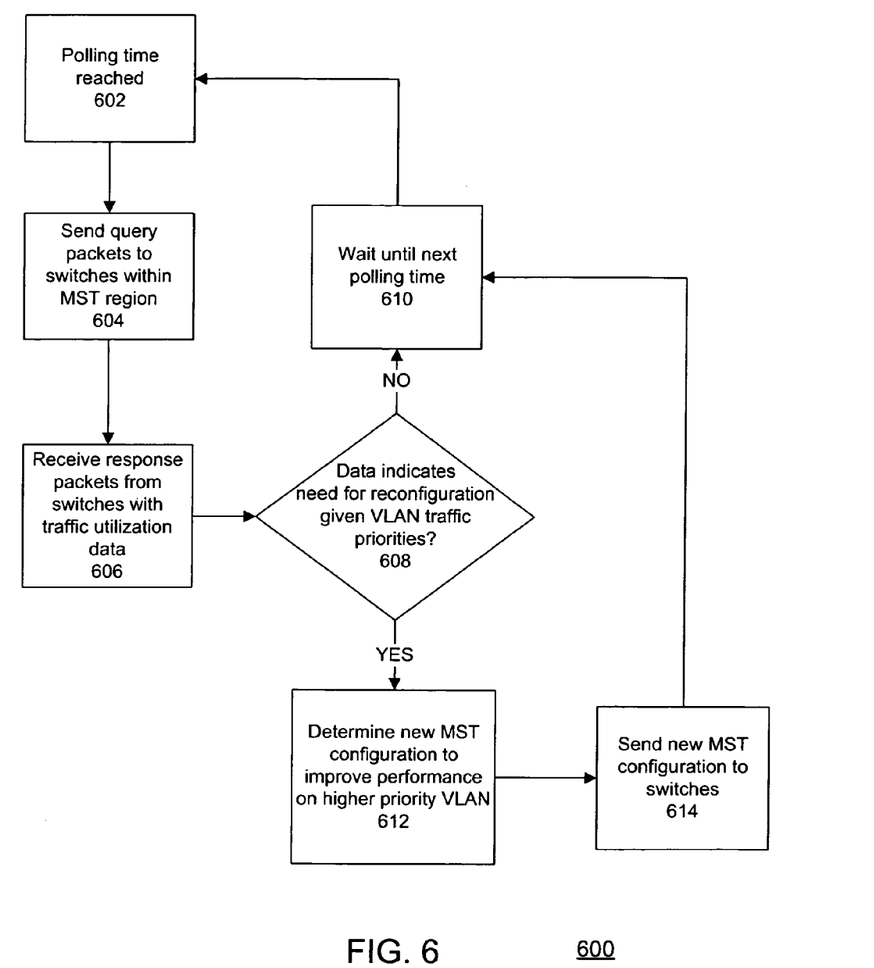
FIG. 6 is a flow chart depicting a method of multiple-instance spanning tree reconfiguration which depends on traffic priority in accordance with an embodiment of the invention.

FIG. 6 is a flow chart depicting a method 600 of multiple-instance spanning tree reconfiguration which depends on traffic priority in accordance with an embodiment of the invention. This method 600 may be performed, for example, using an external network management server 104. The method 600 of FIG. 6 differs from the method 500 of FIG. 5 in that the method 600 of FIG. 6 considers VLAN traffic prioritization in determining 608 a need for reconfiguration and in determining 612 the specific reconfiguration to be made.

In this embodiment, the server 104 may periodically poll all of the switches within the MSTP environment (MST region) for traffic utilization on all of the switch ports. When a polling time is reached (i.e. when it is time for the periodic polling to be performed) 602, the server 104 may send 604 query packets to the switches 102 within the MST region.

When one of the MSTP-enabled switches 102 receives the query, it obtains traffic utilization related data to be sent back in a response. The traffic utilization related data may include, for example, remote monitoring (RMON) counters, port queue depths, numbers of packets transmitted and dropped, and other traffic utilization related data.

The server 104 receives 606 the response packets from the various switches 102 in the MST region. Based on the traffic utilization data, processor-executable code in the server 104 may determine 608 whether the data indicates that a multiple-instance spanning tree reconfiguration is needed. This determination 608 takes into account the traffic priorities assigned to the various VLANs. For example, if a higher priority VLAN has substantially poorer performance statistics and a larger number of packets lost compared with lower priority VLANs, then a reconfiguration may be needed.

If a reconfiguration is not needed then no reconfiguration is performed, and the method 600 may proceed to wait 610 until the next polling time is reached 602.

On the other hand, if a reconfiguration would be substantially beneficial, then a determination 612 is made of a specific reconfiguration. If a higher priority VLAN has unacceptably poor performance, then the specific reconfiguration may improve performance on that VLAN. In the example network discussed above in relation to FIGS. 2A, 2B and 2C, VLAN 4000 may be set to a higher priority for traffic than the other VLANs. In that case, the performance of VLAN 4000 would be given a higher priority when re-mapping VLANs to MSTP instances. Alternatively or in addition to such remappings of VLANs to MSTP instances, other types of MST reconfigurations may be determined 612. For example, MSTP parameters (such as, for instance, port path costs and port priorities) may be modified. Modifying these MSTP parameters may result in a change of the blocking scheme.

The new multiple-instance spanning tree configuration may then be sent 614 from the server 104 to the switches 102. In one implementation, simple network management protocol (SNMP) may be used to send 614 the new configuration from the server 104 to the switches 102. Thereafter, the method 600 may proceed to wait 610 until the next polling time is reached 602.

Figure 7:
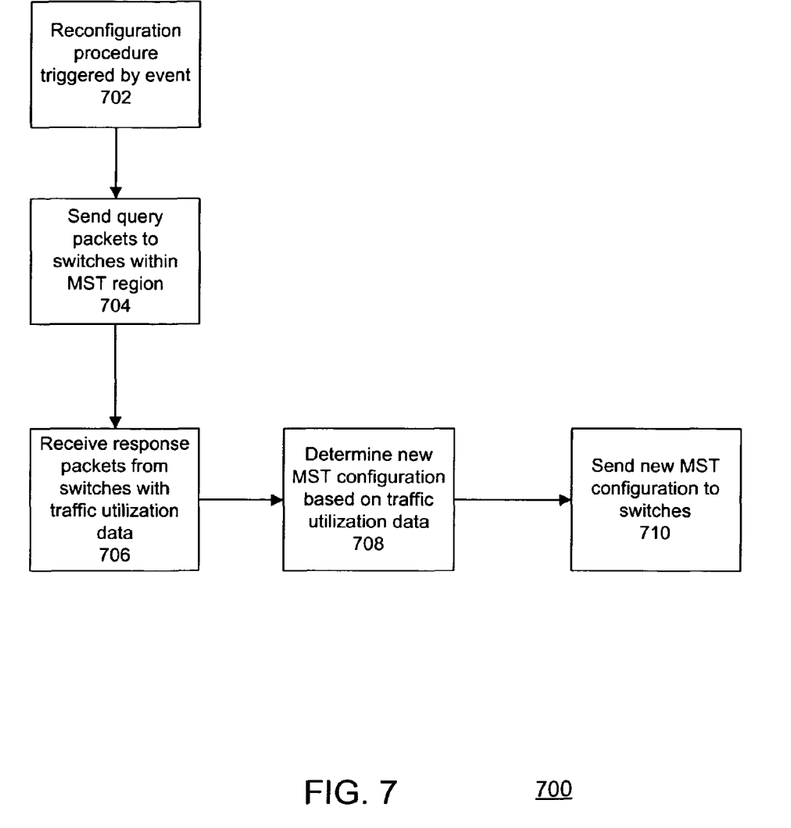
FIG. 7 is a flow chart depicting a method of multiple-instance spanning tree reconfiguration which is event triggered in accordance with an embodiment of the invention.

FIG. 7 is a flow chart depicting a method 700 of multiple-instance spanning tree reconfiguration which is event triggered in accordance with an embodiment of the invention. In accordance with this method 700, the MST reconfiguration procedure may be triggered 702 by an event in the network.

For example, consider a link or switch failure in the MST region. When a link or switch fails, MSTP will reconfigure the spanning trees and change the layouts of the MSTP instances. This reconfiguration of the spanning tree instances to accommodate the changed network topology may trigger 702 a reconfiguration procedure to better optimize the mapping of VLANs to MSTP instances in accordance with an embodiment of the invention. Such a reconfiguration procedure may be desirable because the traffic utilization pattern in the MST region changes with the new topology.

Once the reconfiguration procedure is triggered 702, the server 104 may send 704 query packets to the switches 102 within the MST region. When one of the MSTP-enabled switches 102 receives the query, it obtains traffic utilization related data to be sent back in a response. The traffic utilization related data may include, for example, remote monitoring (RMON) counters, port queue depths, numbers of packets transmitted and dropped, and other traffic utilization related data.

The server 104 receives 706 the response packets from the various switches 102 in the MST region. Based on the traffic utilization data, processor-executable code in the server 104 may determine 708 a specific reconfiguration to improve or optimize performance. For example, the determination 708 may be made so as to maximize the overall performance of the network in the MST region and also to minimize the possibility of traffic loss. The determination 708 may also take into account prioritization of traffic on the VLANs.

The new multiple-instance spanning tree configuration may then be sent 710 from the server 104 to the switches 102. In one implementation, simple network management protocol (SNMP) may be used to send 710 the new configuration from the server 104 to the switches 102.

Figure 8:
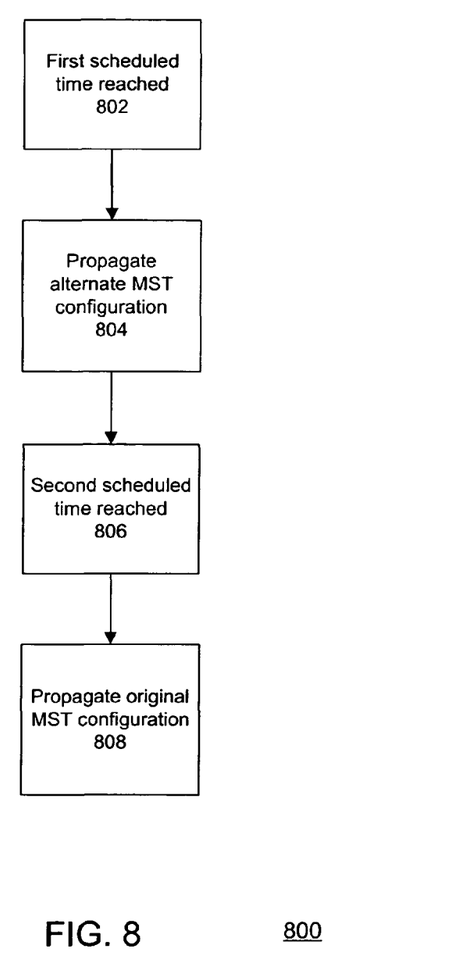
FIG. 8 is a flow chart depicting a method of multiple-instance spanning tree reconfiguration which is scheduled in accordance with an embodiment of the invention.

FIG. 8 is a flow chart depicting a method 800 of multiple-instance spanning tree reconfiguration which is scheduled in accordance with an embodiment of the invention.

Consider a network where network traffic or bandwidth requirements are higher at different times of the day. For example, consider that a backup process occurs on VLAN 7 (on MSTP instance 2 per FIG. 2B) from midnight to 2 am at night.

When a first scheduled time (in this case, midnight) is reached 802 a first scheduled reconfiguration may be propagated 804, for example, to reconfigure the mapping of VLANs to MSTP instances to an alternate mapping so as to provide VLAN 7 with large bandwidth. Besides or in addition to such re-mappings, other types other types of MST reconfigurations may be propagated 804. For example, MSTP parameters (such as, for instance, port path costs and port priorities) may be changed.

When a second scheduled time (in this case, 2 am) is reached 806 a second scheduled reconfiguration may be propagated 808 to return to the original MST configuration.

Figure 9:
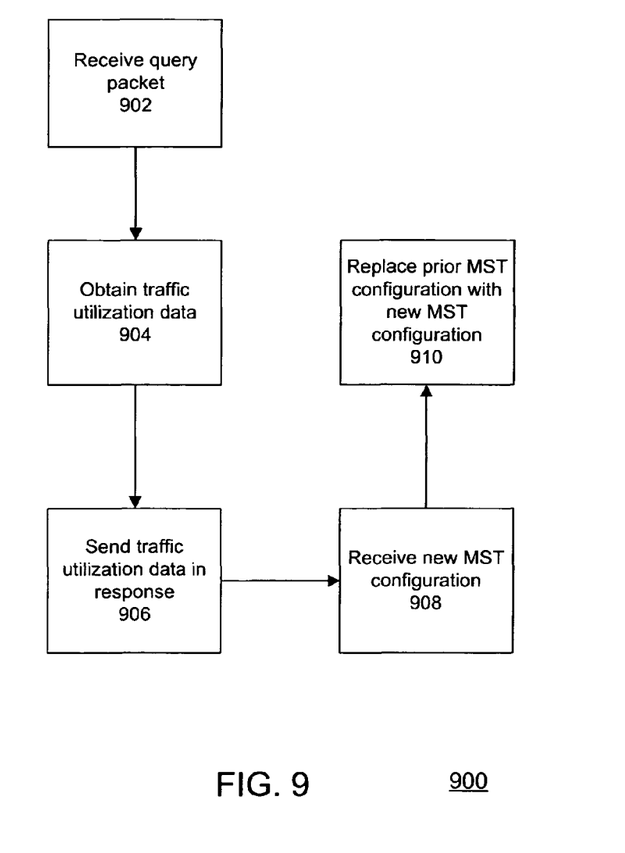
FIG. 9 is a flow chart depicting a method performed at an MSTP-enabled switch in the MST region in accordance with an embodiment of the invention.

FIG. 9 is a flow chart depicting a method 900 performed at an MSTP-enabled switch 102 in the MST region in accordance with an embodiment of the invention. Processor-executable code and/or circuitry within the switch 102 may be configured to perform the steps shown in FIG. 9.

The switch 102 may receive 902 a query packet sent by a server 104. In this case, the query packet may request that the switch 102 return traffic utilization data for its ports. The switch 102 then proceeds to obtain 904 the traffic utilization data. The traffic utilization data may include, for example, remote monitoring (RMON) counters, port queue depths, numbers of packets transmitted and dropped, and other traffic utilization related data. The switch 102 may then send 906 the traffic utilization data back to the server 104 via response packets.

Subsequently, if the server 104 decides to propagate a multiple-instance spanning tree reconfiguration, then a new multiple-instance spanning tree configuration may be received 908 by the switch 102. For example, the new multiple-instance spanning tree configuration may include data that re-maps VLANs to MSTP instances, or it may include new MST parameters (such as new port path costs and/or port priorities). The switch 102 replaces or updates 910 the prior MST configuration with the new MST configuration.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of automated multiple-instance spanning tree reconfiguration, the method comprising:

detecting a first triggering event comprising an initial reconfiguration of a multiple-instance spanning tree (MST) instances due to failure of a link or switch within an MST region;

in response to detecting the first triggering event, sending query packets to switches within the MST region, said query packets requesting statistics for measured data traffic for ports of the switches;

receiving response packets from the switches, said response packets containing said statistics for measured data traffic for the ports of the switches;

determining an MST reconfiguration based on the statistics for measured data traffic for the ports of the switches; and propagating the MST reconfiguration to the switches within the MST region.

2. The method of claim 1, wherein the MST reconfiguration comprises a re-mapping of virtual local area networks (VLANs) to multiple-instance spanning tree protocol (MSTP) instances to move at least one VLAN from one MST instance to another MST instance.

3. The method of claim 1, wherein the MST reconfiguration comprises a modification of MST parameters.

4. The method of claim 1, wherein the query packets are sent periodically to poll the switches as to the statistics for the measured data for the ports of the switches.

5. The method of claim 1, wherein the reconfiguration is determined to improve network performance within the MST region.

6. The method of claim 5, wherein the reconfiguration is further determined to decrease a rate of dropped packets by the switches.

7. The method of claim 1, wherein the reconfiguration is determined in dependence of VLAN traffic priorities to increase performance on a higher priority VLAN.

8. The method of 1, further comprising:

reconfiguring the MST instances to accommodate at a first scheduled network traffic change having a start time and an end time; and after the end time, returning the MST instances to a prior configuration.

9. A network management apparatus for a network, the apparatus comprising:

a processor;

memory for storing processor-executable instructions and data;

a communication system for communicatively coupling components within the network management apparatus; and at least one port communicatively coupled to another device in the network, wherein the memory includes a) processor-executable code to determine an multiple instance spanning tree (MST) reconfiguration based on statistics for measured data traffic for the at least one port, said statistics being received from said at least one port, wherein the reconfiguration comprises a scheduled reconfiguration to accommodate a predetermined change in network traffic; and b) processor-executable code to send packets to multiple-instance spanning tree protocol (MSTP) enabled switches within a MST region to propagate said MST reconfiguration.

10. The apparatus of claim 9, wherein the MST reconfiguration comprises a re-mapping of virtual local area networks (VLANs) to multiple-instance spanning tree protocol (MSTP) instances to move at least one VLAN from one MST instance to another MST instance.

11. The apparatus of claim 9, wherein the MST reconfiguration comprises a modification of MST parameters comprising port path costs and port priorities.

12. The apparatus of claim 9, further comprising:
processor-executable code to send query packets to switches within an multiple-instance spanning tree (MST) region, where the query packets request statistics for measured data traffic for ports of the switches; and
processor-executable code to receive and process response packets from the switches with the statistics for measured data traffic for the ports of the switches.

13. The apparatus of claim 12, wherein the query packets are sent periodically to poll the switches as to the statistics for measured data traffic for the ports of the switches.

14. The apparatus of claim 12, wherein the query packets are sent after a triggering event.

15. The apparatus of claim 14, wherein the triggering event comprises a reconfiguration of the MST instances due to a failed link or switch within the MST region.

16. The apparatus of claim 9, wherein the scheduled reconfiguration comprises a start time and an end time.

17. The apparatus of claim 9, wherein the reconfiguration is determined to improve network performance within the MST region.

18. The apparatus of claim 9, wherein the reconfiguration is determined in dependence of VLAN traffic priorities, and wherein the reconfiguration is determined to increase performance on a higher priority VLAN.

19. A network switching apparatus, the apparatus comprising:
a processor;
memory for storing processor-executable instructions and data;
a communication system for communicatively coupling components within the apparatus; and
at least one port communicatively coupled to another device in the network,
wherein the memory includes
a) processor-executable code to obtain statistics for measured data traffic for all ports of the apparatus when a query packet requesting the statistics for measured data traffic is received;
b) processor-executable code to send a response packet in reply to the query packet, wherein the response packet includes the statistics for measured traffic utilization;
c) processor-executable code to replace a first multiple-instance configuration with a second multiple-instance configuration based on the statistics for measured data traffic;
d) processor-executable code to reconfigure the second multiple instance configuration to accommodate at a scheduled network traffic change having a start time and an end time; and
e) processor-executable code to return to the second multiple instance configuration after the end time.

* * * * *

UNITED STATES PATENT AND TRADEMARK OFFICE
CERTIFICATE OF CORRECTION

| | | |
|---|---|---|
| PATENT NO. | : 8,693,375 B2 | Page 1 of 1 |
| APPLICATION NO. | : 11/581815 | |
| DATED | : April 8, 2014 | |
| INVENTOR(S) | : Frank A. Reichstein et al. | |

It is certified that error appears in the above-identified patent and that said Letters Patent is hereby corrected as shown below:

In the Claims

In column 8, line 36, in Claim 4, after "data" insert -- traffic --.

Signed and Sealed this
Thirteenth Day of January, 2015

Michelle K. Lee
*Deputy Director of the United States Patent and Trademark Office*